(12) United States Patent
Tickner et al.

(10) Patent No.: US 8,606,568 B1
(45) Date of Patent: Dec. 10, 2013

(54) EVALUATING PRONOUNS IN CONTEXT

(71) Applicant: Google Inc., Mountain View, CA (US)

(72) Inventors: Simon Tickner, Whistable (GB); Richard Z. Cohen, London (GB)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/658,110

(22) Filed: Oct. 23, 2012

Related U.S. Application Data

(60) Provisional application No. 61/712,025, filed on Oct. 10, 2012.

(51) Int. Cl.
G10L 15/00 (2013.01)

(52) U.S. Cl.
USPC ........... 704/231; 704/246; 704/247; 704/251; 704/252

(58) Field of Classification Search
None
See application file for complete search history.

(56) References Cited

U.S. PATENT DOCUMENTS

| | | | |
|---|---|---|---|
| 6,125,342 A * | 9/2000 | Selesky | 704/9 |
| 6,430,531 B1 * | 8/2002 | Polish | 704/257 |
| 6,604,094 B1 * | 8/2003 | Harris | 706/48 |
| 6,839,669 B1 | 1/2005 | Gould et al. | |
| 2003/0101047 A1 * | 5/2003 | Panttaja | 704/9 |
| 2003/0216919 A1 * | 11/2003 | Roushar | 704/260 |
| 2007/0174057 A1 * | 7/2007 | Genly | 704/270 |
| 2008/0208864 A1 * | 8/2008 | Cucerzan et al. | 707/8 |

OTHER PUBLICATIONS

Voice Commands-Dictation Tool—LexiaTech, http://www.google.com/url?sa=t&rct=j&q=&esrc=s&frm=1&source=web&cd=4&ved=0CDYQFjAD&url=http%3A%2F%2Flexiatech.com%2Fwp-content%2Fuploads%2F2011%2F10%2FVoice-Commands-MTB. doc&ei=k8SFUOyEFo6y9gTskYDABg&usg=AFQjCNEVpSZsa_nWPqMtdeS7CK_Tb-hyw&sig2=5vX5PFtxn89Dbihs0V2GjQ downloaded from the internet on Aug. 2, 2012, 8 pages.

What is better than this?: No Siri It's ok—you iPhone already has voice commands, http://www.patrickkaine.com/201110/no-siri-its-ok-your-iphone-already-has.html , downloaded from the internet on Aug. 2, 2012, 3 pages.

Full List of Siri Commands I Windows Tablet PC Blog, www.windowstablet.tv/full-list-of-siri-commands/downloaded from the Internet on Aug. 2, 2012, 11 pages.

* cited by examiner

Primary Examiner — Leonard Saint Cyr
(74) Attorney, Agent, or Firm — Fish & Richardson P.C.

(57) ABSTRACT

Methods, computer program products, and systems are described for receiving, by a speech recognition engine, audio data that encodes an utterance and determining, by the speech recognition engine, that a transcription of the utterance includes one or more keywords associated with a command, and a pronoun. In addition, the methods, computer program products, and systems described herein pertain to transmitting a disambiguation request to an application, wherein the disambiguation request identifies the pronoun, receiving, by the speech recognition engine, a response to the disambiguation request, wherein the response references an item of content identified by the application, and generating, by the speech recognition engine, the command using the keywords and the response.

23 Claims, 6 Drawing Sheets

EVALUATING PRONOUNS IN CONTEXT

CROSS-REFERENCE TO RELATED APPLICATION

This application claims the benefit of U.S. Provisional Patent Application No. 61/712,025, filed Oct. 10, 2012, which is incorporated herein by reference.

TECHNICAL FIELD

This specification generally describes systems and techniques for evaluating speech input.

BACKGROUND

A speech recognition system receives spoken words as input, and transcribes the spoken words into text. When the text is entered into certain types of programs, such as a word processing program, it may not be necessary for the speech recognition system to associate a particular meaning with a particular spoken word.

SUMMARY

This document generally describes systems and techniques for evaluating speech input that includes one or more pronouns. In general, pronouns in speech input may be ambiguous to a speech recognition system without having corresponding contextual or application information. Accordingly, in the event that a user is not explicit about one or more nouns in her speech input, the systems described herein may implement other logic or algorithms to dynamically resolve the semantic meaning behind the user's chosen speech input. In particular, when an ambiguity in received speech input is determined, the speech recognition system can coordinate with a referring application. For example, if the user speaks "Save this," the speech recognition system and the referring application can attempt to resolve a possible meaning of the pronoun "this." The referring application can pass the resolved meaning back to the speech recognition system and the speech recognition system can use the meaning as one signal in determining the likely meaning for the pronoun. For example, with respect to the pronoun "this," the speech recognition system can generate and send a disambiguation request to the application for purposes of determining what the user may have referred to by the pronoun "this." The systems can resolve that "this" implies the "content" on the screen, for example. In some implementations, these parsing and interpretation processes can include analyzing various contextual cues, user data, as well as client data, server data, and/or third party data as will be discussed in more detail below.

In one implementation, methods, computer program products, and systems are disclosed. The method includes receiving, by a speech recognition engine, audio data that encodes an utterance. The method also includes determining, by the speech recognition engine, that a transcription of the utterance includes one or more keywords associated with a command, and a pronoun. The method further includes transmitting a disambiguation request to an application, wherein the disambiguation request identifies the pronoun and receiving, by the speech recognition engine, a response to the disambiguation request, wherein the response references an item of content identified by the application. In some implementations, the response to the disambiguation request includes a GPS location and a user identifier. In such an implementation, the method can include having the speech recognition engine employing one or more predetermined rules based on the GPS location and the user identifier.

The method additionally includes generating, by the speech recognition engine, the command using the keywords and the response. In some implementations, generating the command includes accessing predetermined rules pertaining to one or more keywords associated with the pronoun. In some implementations, the method can also include weighting the merged results and generating a set of weighted results from the merged results. In some implementations, In some implementations, the method also includes (i) transmitting one or more additional disambiguation requests to a disambiguation engine, (ii) receiving, by the speech recognition engine, a response to the one or more additional disambiguation requests, (iii) merging results from the one or more additional disambiguation requests and the disambiguation request (iv) evaluating the merged results to determine a semantic connection between the application and the command, and/or (v) generating a mapping of the application to the command.

In another implementation, the method includes (i) determining, by an application, that a control for initiating speech recognition has been selected, (ii) receiving, by the application, a disambiguation request from a speech recognition engine, wherein the disambiguation request identifies a pronoun, (iii) identifying, by the application, an item of content based on the pronoun, and/or (iv) transmitting, by the application, a response to the disambiguation request, wherein the response references the item of content.

In some implementations, the method includes a disambiguation request that further identifies a command associated with the pronoun, wherein the item of content is identified further based on the command. In one implementation, the item of content is identified based at least in part on the command and a predetermined rule set. In some implementations, such a predetermined rule set pertains to the application.

In another implementation, a computer-implemented system is disclosed. The system includes one or more computers and one or more storage devices storing instructions that are operable, when executed by the one or more computers, to cause the one or more computers to perform operations. The operations include (a) receiving, by a speech recognition engine, audio data that encodes an utterance, (b) determining, by the speech recognition engine, that a transcription of the utterance includes one or more keywords associated with a command, and a pronoun, (c) transmitting a disambiguation request to an application, wherein the disambiguation request identifies the pronoun, (d) receiving, by the speech recognition engine, a response to the disambiguation request, wherein the response references an item of content identified by the application, and (e) generating, by the speech recognition engine, the command using the keywords and the response. In addition, the system can also include (f) transmitting one or more additional disambiguation requests to a disambiguation engine, (g) receiving, by the speech recognition engine, a response to the one or more additional disambiguation requests, (h) merging results from the one or more additional disambiguation requests and the disambiguation request, (i) evaluating the merged results to determine a semantic connection between the application and the command, and (j) generating a mapping of the application to the command. The system may also include a step of weighting the merged results and generating a set of weighted results.

In some implementations, generating the command includes accessing predetermined rules pertaining to one or more keywords associated with the pronoun.

In some implementations, the response to the disambiguation request includes a GPS location and a user identifier and the speech recognition engine employs one or more predetermined rules based on the GPS location and the user identifier.

The details of one or more embodiments are set forth in the accompanying drawings and the description below. Other potential features and advantages will be apparent from the description and drawings, and from the claims.

DESCRIPTION OF DRAWINGS

Like reference symbols in the various drawings indicate like elements.

DETAILED DESCRIPTION

Figure 1:
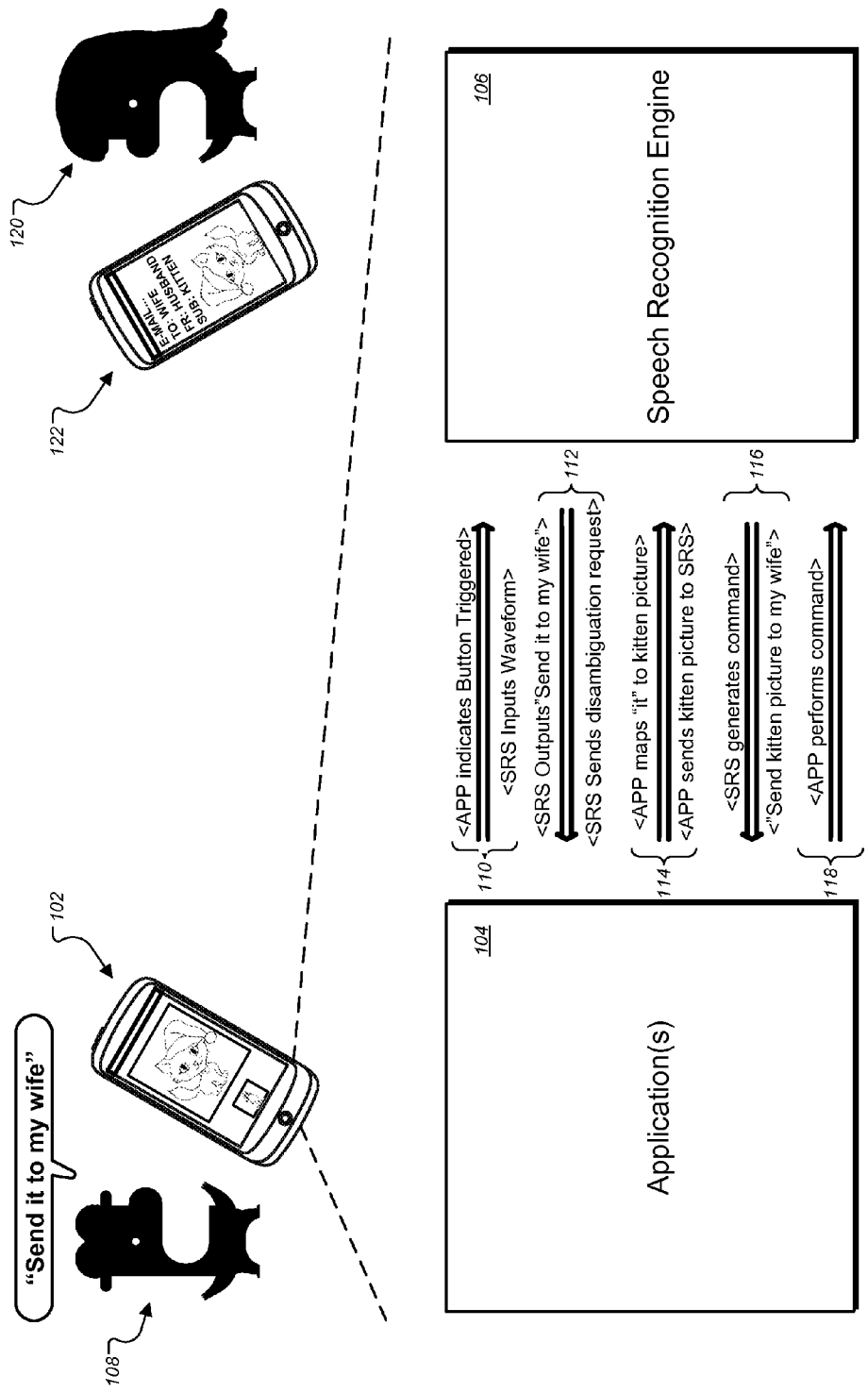
FIG. 1 is a conceptual diagram of an exemplary framework for evaluating the semantic meaning of a pronoun within a speech utterance.

This specification describes techniques and systems that may be used to evaluate speech input received from a user of a computing device, such as a smartphone. In certain instances, the systems described in this specification can evaluate received speech input to determine a speech-to-text transcription of the input as well as a semantic definition for some or all of the input. In general, the semantic definition for the speech input can include the explicit or literal meaning of one or more terms within the input. The semantic definition of one or more spoken terms can be used as a basis for determining the intended meaning of one or more terms in the user's speech input. In a specific example, the systems can receive speech input with a pronoun, such as "it" and determine what the user meant by using the pronoun. In particular, the systems can determine that the spoken pronoun "it" stands for a current open document, an image on the smartphone, an open email, a completed text message, etc.

In some implementations, the systems can easily interpret a sequence of words including one or more verbs and/or nouns. Such a sequence may include a command or task as a verb and another user's name as the noun that is acted upon. In addition, the sequence can include other nouns or verbs, each of which the systems can interpret, evaluate, and act upon accordingly. For example, if the user speaks the phrase "Email the directions to Tom," the systems described in this specification can determine "Email" is a command and that "directions" and "Tom" are nouns that the command may refer to. The systems can further determine that the likely intent of the input was to get the user's computing device to email a set of available directions to Tom. The systems can employ speech recognition engines, global positioning system data, application data on external servers and/or application data on the user's computing system to accomplish the user's request.

In the event that the user is not explicit about one or more nouns or adjectives in her speech input, the systems may implement other logic or algorithms to dynamically resolve the meaning behind the user's chosen speech input. For example, if the user speaks the phrase "Move this to my projects folder," the systems described in this specification can parse the phrase, determine a command or task such as "move," and determine that "move" modifies the pronoun "this." For example, the systems may analyze a state, status, location of a computing device, or other metric to determine the user's intended meaning of "this" in a particular context. In some implementations, the systems may apply a set of rules or device cues to determine the user's actual meaning for the pronoun. In other implementations, the systems may use a weighting system, a dynamic or static lookup, and/or another algorithm to otherwise resolve the semantic meaning behind the pronoun.

In the above example, the systems can additionally determine that the noun "folder" is modified by the pronoun "my." With this knowledge, the systems can determine what the user intended by the pronouns "this" and "my." In particular, when an ambiguity in received speech input is determined, a speech recognition engine can coordinate with a referring application. The referring application can attempt to resolve a possible meaning of the pronouns "this" and "my," for example. The referring application can pass the resolved meaning back to the speech recognition engine. Upon receiving a possible resolved meaning for the pronouns, the speech recognition engine can use the meaning as one signal in determining the likely meaning for the pronouns. Namely, the systems can resolve that "this" implies the content on the screen and that "my" implies the user of the phone that has a personalized folder on the computing device named "projects." In some implementations, these parsing and interpretation processes can include analyzing various contextual cues, user data, as well as client data, server data, and/or third party data as will be discussed in more detail below.

FIG. 1 is a conceptual diagram of an exemplary framework 100 for evaluating the semantic meaning of one or more pronouns within a speech utterance. In particular, the framework 100 includes a client device 102. The client device 102 can include, for example, a cellular telephone, a personal digital assistant (PDA), a music player, a tablet computer, a wearable computer, an embedded system, an e-book reader, or other processing device. A user may invoke certain functionality on the client device 102 by using input controls, such as buttons, a number pad, a touch screen, a miniature keyboard, a voice input device, or a stylus.

The framework 100 also includes one or more applications 104 and a speech recognition engine 106. The applications 104 are generally part of the client device 102, but may have access to one or more servers (not shown) for purposes of carrying out tasks. In some implementations, the applications 104 may be provided from a server to client device 102. The speech recognition engine 106 is shown as part of the client device 102, in this example, and as such, the engine 106 may function and interact with the operating system of the device 102 similar to an application. In certain implementations, the speech recognition entity is represented as part of an application, rather than as a separate engine. In some implementations, certain functions of the speech recognition engine 106 are carried out on the client device 102, while other functions are carried out on a server system (not shown).

As shown in FIG. 1, a user 108 is viewing a picture of a kitten in the application 104 on client device 102. In this example, the user has initiated a recording by using a microphone on client device 102. For example, the user may have selected a microphone triggering mechanism and began speaking into a microphone on the client device 102. In some implementations, to initiate a recording for speech input on device 102, the user 108 may press a button to trigger a microphone for recording speech. For example, the user 108 can tap a record button displayed on the user interface of a voice command application. As another example, the user 108 can press and hold a physical button of the client device 102 that has been preprogrammed to initiate a recording until the client device 102 indicates that recording of the speech has commenced.

The application 104 may represent any application on the client device 102 that is capable of receiving speech input. For example, the application 104 may be a word processing program, an email program, a navigation program, a music program, a browser, or another application with access to a microphone control on the client device 102. In some implementations, the application 104 may be a standalone interface that represents a graphical control on device 102. For example, the application 104 may be a graphical user interface (GUI) component on a home screen of the client device 102.

The speech recognition engine 106 may provide the client device 102 with suitable recognition models, such as voice models, language models, speech models, acoustic models, noise models, and/or other models, to translate spoken utterances and enhance the intelligibility of the spoken utterances. These models can be used by a number of modules within the speech recognition engine 106 including, but not limited to disambiguation engines, rules, encoders, and/or interpreters, each of which can be capable of assessing speech input. In some implementations, the speech recognition engine 106 may be a set of applications that function together to perform speech-to-text conversions and disambiguation requests.

Returning to the example in FIG. 1, once a microphone is triggered, the user 108 uttered the phrase "Send it to my wife." In response to the user's actions, the application 104 can indicate that a microphone button was triggered and can enable the microphone. As shown by arrow 110, the application 104 can then receive the user's speech input, upload the spoken phrase as a waveform, and send the waveform to the speech recognition engine 106.

At arrow 112, the speech recognition engine 106 may perform a speech-to-text translation of the speech input and/or perform other analysis to identify content in the received speech. In addition, the speech recognition engine 106 can determine semantic definitions or representations for some or all of the words in the speech input. In the depicted example, the speech recognition engine 106 can, for example, determine an email address for the user's wife, since the request included a request to email her. With respect to the pronoun "it," the speech recognition engine 106 can generate and send a disambiguation request to the application 104 for purposes of determining what the user may have referred to by the pronoun "it."

At arrow 114, the application 104 receives the disambiguation request, performs some analysis and determines that the pronoun "it" was likely referring to the image of the kitten on the user's device 102. The application 104 can then map the pronoun "it" to the picture of the kitten shown on device 102. In some implementations, the application 104 may send both the mapping and the kitten picture to the speech recognition engine 106. In some implementations, the application 104 simply sends the mapping and the speech recognition engine 106 stores the mapping for future use.

At arrow 116, the speech recognition engine 106 generates a command based at least in part on the received mapping, or in some examples, based in part on the received mapping and the received content (e.g., the kitten picture). The command may include one or more words, and in some implementations, can include the user's original speech input with the pronouns replaced by the semantic meaning of the pronouns. In the current example, the generated command may include the phrase "Send kitten picture to my wife." The command may be forwarded to the application 104. The application 104 may carry out the command or forward the command to an appropriate application for performance, as shown by arrow 118. In operation, the application 104 carried out the generated command by generating and sending an email to the user's wife 120 and placing the kitten picture in the email, as shown in device 122.

In certain implementations, commands can be generated using both (i) one or more keywords received in the speech input and (ii) the response to the disambiguation request detailing the semantic meaning of the pronoun. To generate such a command, the application 104 may access one or more predetermined rules that pertain to one or more keywords associated with a pronoun. For example, the application 104 can use the keyword "send" in the user's speech input to determine to generate an email and can use the disambiguated "it" to place the kitten picture into the email.

Figure 2:
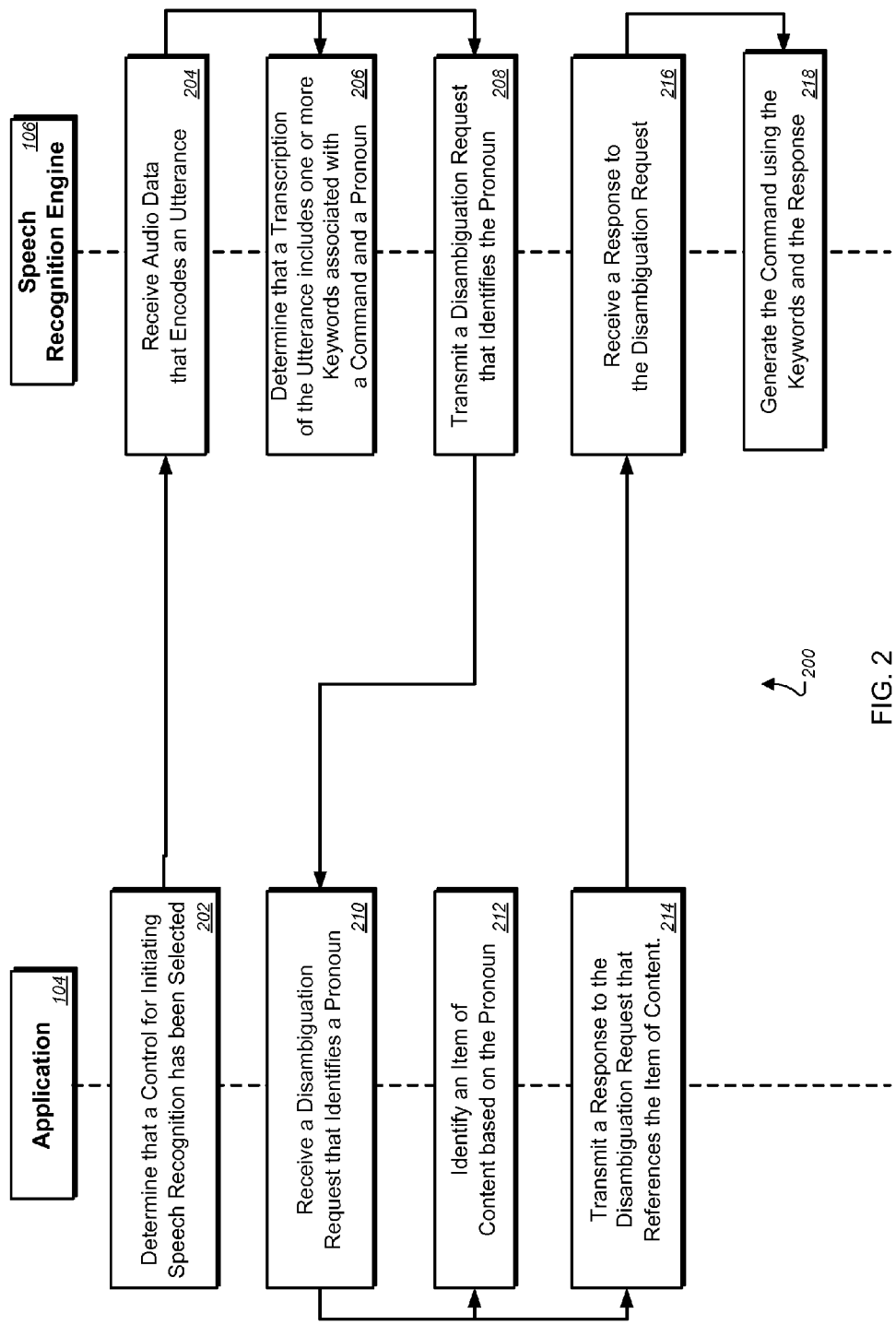
FIG. 2 is a flowchart of an example method showing actions taken to interpret the semantic meaning of a pronoun within a speech utterance.

FIG. 2 is a flowchart of an example method 200 showing actions taken to interpret the semantic meaning of a pronoun within a speech utterance. For convenience, the method 200 will be described with respect to a system (e.g., the framework 100 or mobile client device 102 or speech recognition engine 106 framework 300) that performs the method 200. The system can be implemented or associated with hardware components, software components, or firmware components, or any combination of such components. For example, the system can be implemented on the client device 102 that includes the application 104 and the speech recognition engine 106. In some implementations, the system can be implemented or associated with general purpose servers, software processes and engines, and/or various embedded systems.

The method 200 may begin with a user wishing to access a voice system on client device 102, for example. To begin using the voice system, the user can select a hardware or software control and begin speaking into a device microphone. The application 104 determines (202) that a control for initiating speech recognition has been selected. For example, the application 104 may determine that a microphone button has been pressed. The application 104 can initiate speech recognition functions on the client device 102 by collecting speech input from a user and forwarding the speech input to the speech recognition engine 106. For example, the application 104 can generate a waveform of the user's recorded audio data and send, to the speech recognition engine, an encoded utterance of the audio data.

In response to the application 104 sending the audio data, the speech recognition engine 106 receives (204) audio data that encodes an utterance spoken by the user. In some implementations, the utterance includes a command and information needed to carry out the command. In some implementations, the utterance includes inquiries, confirming instructions, or simply information the user wishes to store.

The speech recognition engine 106 analyzes the audio data and determines (206) that a transcription of the utterance includes one or more keywords associated with a command, and a pronoun. For example, if a user spoke "Read that aloud," the speech recognition engine 106 can determine that the command is "read . . . aloud" and the pronoun is "that." Once a pronoun is found in an uttered phrase, the speech recognition engine 106 can attempt to work with the application 104 to determine what the user likely intended to communicate using the pronoun.

The determination process may include transmitting (208) a disambiguation request that identifies the pronoun. In the above example, the speech recognition engine 106 would send a disambiguation request that identifies "that" as the pronoun. The disambiguation request can, in some implementations, include one or more best guesses of a semantic definition for the received pronoun.

The application 104 receives (210) the disambiguation request that identifies the pronoun and any additional information that the speech recognition engine 106 deemed pertinent. The application 104 uses the identified pronoun to identify (212) an item of content based on the pronoun. Continuing with the above example, if the user entered the "Read that aloud," utterance while in an email program, then the application 104 may determine that the pronoun "that" pertains to an email that is selected on the client device 102. The application can then deduce that the item of content is the email. Similarly, if the application 104 determines that the user is in a reading application, the item of content can be identified as the currently open book. In some implementations, the application 104 may determine that the user is simultaneously accessing other information on the device 102 and as such, the application 104 can use a number of predetermined rules, look up tables, or other guidelines to identify one or more items of content based on the received pronoun. The concept of identifying content based on context, location, or other factors will be discussed in detail below.

Upon identifying an item of content based on the pronoun, the application 104 transmits (214) a response to the disambiguation request that references the item of content. For example, if the application 104 determined that the user was indeed in an email program and accessing a particular email, the application 104 can prepare a response to the disambiguation request that includes the email content. In some implementations, the response to the disambiguation request can additionally include which application was in use and/or associated data including, but not limited to timestamp data, location data, user data, and/or metadata.

The speech recognition engine 106 receives (216) the response to the disambiguation request and generates (218) the command using the keywords and the response. For example, in the event that the disambiguation request includes the email as the item of content, the speech recognition engine 106 generates the response "Read the selected email aloud." That is, the speech recognition engine 106 can replace the pronoun in the phrase "Read that aloud" with the intended meaning of "that" to enable the client device 102 to carry out the user's request. In some implementations, the client device 102 or an external server can store such information as a rule or guideline for future requests. For example, if such a rule were stored, the speech recognition engine 106 may be able to generate the command to read an active document aloud whenever a request to "read aloud" were received. In other implementations, the speech recognition engine 106 can store a rule to ask a user in a disambiguation request about which open document should be read aloud. For example, if the application 104 sends a response to a first disambiguation request that notes that three items of content are currently open or accessible, then the speech recognition engine 106 may have a rule to generate a command for each of the three items and send the request to inquire which item should be read aloud.

In certain implementations, generating the command using the keywords and the response can include accessing one or more predetermined rules that pertain to one or more keywords associated with a pronoun. For example, the speech recognition engine 106 can use the keywords as a basis for accessing particular lookup tables (as described in FIG. 4A) or rules (as described in FIG. 4B).

In some implementations, any number of disambiguation requests can be sent to the application 104. For example, in response to speech input, the speech recognition engine 106 may transmit one or more additional disambiguation requests to a disambiguation engine. The application 104 can send one or more responses to the additional disambiguation requests.

In certain implementations, the speech recognition engine 106 can merge results from the one or more additional disambiguation requests and the first disambiguation request. This merging of results may provide a user with additional options to choose from. For example, if the user spoke "Upload it," the speech recognition engine 106 can send a disambiguation request to determine the intended semantic definition of the pronoun "it." In addition, other disambiguation requests can be sent to determine a location in which to upload "it" and similarly, when to upload "it." The application can provide responses to any received disambiguation requests. The speech recognition engine 106 can receive the responses and offer up a number of possible options to the user. In some implementations, the speech recognition engine 106 receives the responses and carries out the intended functions.

In some implementations, the speech recognition engine 106 can evaluate the merged results to determine a semantic connection between the application and the command. For example, the speech recognition engine 106 can determine that each time a user speaks "read it aloud," she is in a reading application. Thus, the speech recognition engine 106 can do a check to verify that the user is in the reading application and perform the task without having to generate and send additional disambiguation requests.

If the speech recognition engine 106 determines a semantic connection between an application and a command, the engine 106 can generate a mapping of the application to the command. For example, if the user always speaks the command "read it aloud" when in a reading application, the engine 106 can cache this information and generate a semantic connection between the reading application and the command to read aloud. Similar requests, received in the future, to "read it aloud" spoken while in the reading application may be granted almost immediately without the engine 106 having to send disambiguation requests.

In some implementations, the speech recognition engine 106 can apply weightings to a set of merged results. The engine 106 can then generate a set of weighted results. For example, the speech recognition engine 106 can apply a high weighting to one result in a list of three because the one result is related to content in an open application on the user's computing device, for example. The high weighting may indicate that one particular response is more likely to be relevant to a disambiguation request than another lower weighted response. The engine 106 can similarly apply a lower rating to a result that was provided as part of a merged result because the result may have been gathered at an earlier date. For example, any number of results can be merged and some of these results can be collected from one or more databases that host information that can be collected over a long time period. The engine 106 can apply a number of rules for selecting the results, which can allow selection of one or more results from previously collected data.

In certain implementations, additional user data can be included in an application's response to a disambiguation request. For example, the application 104 can provide a Global Positioning System (GPS) location of the user's client device 102 and/or user identifier data for the user accessing the speech recognition engine 106. In the event that the disambiguation request includes a GPS location and/or a user identifier, the speech recognition engine 106 can use this additional information to provide more relevant options for which content the user was referring to when using a particular pronoun in her request.

In some implementations, the disambiguation request further identifies a command associated with the pronoun and an item of content can be identified based on the command. In other implementations, the item of content is identified based in part on the command and based in part on a predetermined rule set. The rules set may simply pertain to the application that a user is currently accessing.

As an example, the user may be accessing an email application during the workday in which a specific email includes a reminder about an upcoming concert for which the user wishes to purchase tickets. In this example, the client device 102 may be aware of the GPS location of the client device 102. While viewing the email about the concert, the user can access a microphone on device 102 and speak "Remind me about that when I get home." In this example, triggering a recording on device 102 can begin method 200. Accordingly, upon receiving the recording input, sending the input to the speech recognition engine, and receiving a disambiguation request from the speech recognition engine 106, the application 104 can send GPS location data to the speech recognition engine 106 in addition to one or more determinations for what the spoken pronoun "that" was intended to imply. The speech recognition engine 106 can also use the received GPS location data and monitor such data to determine when the user is actually at home and, as such, can then make a determination for the meaning of the term "when" in the user's utterance "Remind me about that when I get home." The speech recognition engine 106 can feed a command back to the application with some or all of the disambiguated data. For example, the speech recognition engine 106 can send the command "Remind me about the Lady Gaga concert at 5:30 P.M."

In the above example, the application 104 and the speech recognition engine 106 may utilize email application data, user selection data, and context data to determine that "that" was intended to mean "the Lady Gaga concert." In particular, the application 104 determined that the user was accessing a specific email detailing the Lady Gaga concert and sent a response to a disambiguation request received from the speech recognition engine 106 detailing the connection. In addition, the GPS location data may be used to indicate that the user was not yet home, and as such, no reminder should yet be sent. The speech recognition engine 106 may have additionally used other user identifying information logged in previous actions with client device 102. For example, engine 106 may have a rule stored that the user's definition of home is outside of business hours, according to the calendar settings in the email application. Accordingly, the application 104 can determine that "when" was intended to mean "at 5:30," according to a stored rule or a known time of home arrival.

Figure 3:
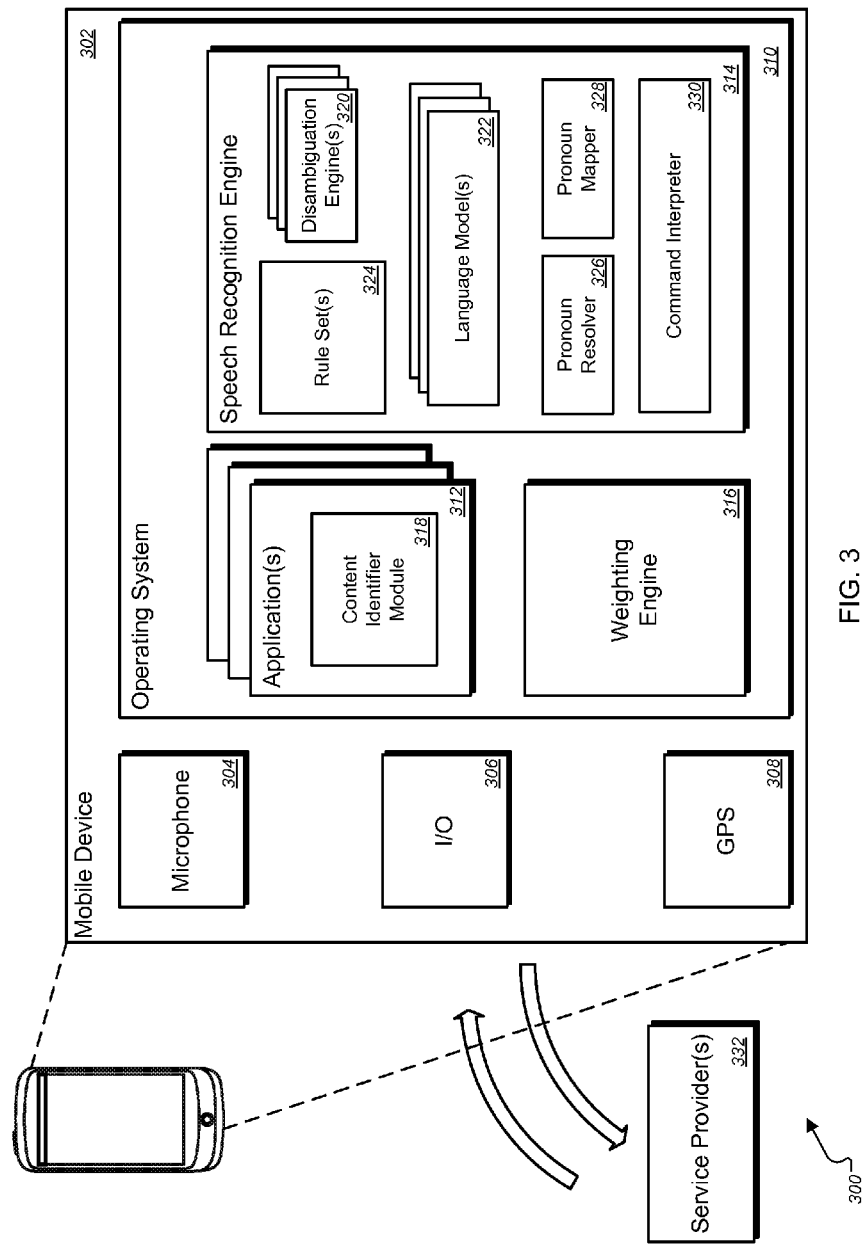
FIG. 3 is a conceptual diagram showing example framework for evaluating the semantic meaning of a pronoun.

FIG. 3 is a conceptual diagram showing example framework 300 for evaluating the semantic meaning of a pronoun. In FIG. 3, a mobile device 302 includes a microphone 304, one or more I/O interfaces 306, and a global positioning system (GPS) 308. The microphone can be accessed by a user and used to enter speech input into device 302. The I/O interfaces 306 can be used to send and receive various signals to and from the mobile device 302. The GPS 308 can be used to determine and/or track the location of mobile device 302.

Framework 300 illustrates an example operating system 310 running on mobile device 302. The operating system 310 in the depicted example includes one or more applications 312, a speech recognition engine 314, and a weighting engine 316. In some implementations, one or more applications 312 or engines 314 or 316 can be operational outside of operating system 310 and as such, may be located on other external devices.

The applications 312 may represent any number of applications running on mobile device 302. One or more of the applications 312 may be integrated with voice command or speech recognition software. In certain implementations one or more applications 312 includes a content identifier module 318. The content identifier module 318 generally represents an algorithm that may be used to identify content that pertains to one or more pronouns received as speech input to application 312, for example. The content identifier module 318 can determine that specific content or information, within an open application 312, pertains to a spoken pronoun. For example, if a user is viewing an image gallery online in a browser application or simply in a photograph application and speaks the phrase "Save that to my gallery," the content identifier module 318 can determine that the user meant that one of the images in the open browser pertains to the pronoun "that." Namely, the content identifier module 318 can identify a context for the user to determine the semantic meaning of one or more spoken pronouns. The context may pertain to open applications, visible content within a screen, words surrounding the pronoun, previous user interactions with the mobile device 302, and/or user location, just to name a few examples. In some implementations, the content identifier module 318 users an intricate set of rules to resolve the semantic meaning of a particular pronoun. Such rules can be combined with other known user data to determine an appropriate response to received user input The speech recognition engine 314 can convert received speech input into words, word phrases, commands and/or semantic context. The speech recognition engine 314 can include any type of speech recognition engine, including a Continuous Speech Recognizer (CSR), or a discrete word recognizer. The speech recognition engine 312 includes one or more disambiguation engines 320, one or more language models 322, and rule sets 324.

Although, speech recognition engine 314 is shown in this example as part of mobile device 302, other speech engines, voice engines, and similar architecture can be utilized in systems external to the device. For example, the mobile device 302 can access a remote server to determine GPS location data, access stored speech files, retrieve external application data, perform calculations, and perform speech recognition processes, just to name a few examples. In certain implementations, the mobile device 302 can access one or more service providers 332 to perform similar operations and/or to retrieve information.

The disambiguation engines 320 receive appropriate communications from the applications 312 and routes such communications to proper processing servers or other engines. For example, the disambiguation engine 320 may route received speech input to the speech recognition engine 314. The speech recognition engine 314 can use the received input to determine a number of possible responses that may be a match for what a user is requesting in the speech input.

The language models 322 and rule sets 324 can be utilized by the speech recognition engine 314 to determine the semantic meaning of one or more words spoken by a user. The language models 322 can provide statistical support when estimating a meaning one or more words in speech input that the mobile device 302 may receive.

The speech recognition engine also includes a pronoun resolver 326 and a pronoun mapper 328. The pronoun resolver may access language models 322 and/or rule sets 324 to determine, for example, if received speech input includes one or more nouns referred to by pronouns. The pronoun resolver 326 can then determine which noun was intended by a particular pronoun.

The speech recognition engine also includes a command interpreter 330. The command interpreter 330 can receive candidate words, word phrases, commands, or contextual cues and process the received data into instructions for an application 312, for example. The command interpreter 330 can also monitor the application 312 in order to prepare for interpreting one or more disambiguation responses or interpreting user input or redirection responses.

In operation, the command interpreter 330 can interpret a pronoun such as "her" in a number of different ways. For example, if the user is looking at a calendar application, and states "Schedule an appointment with her today," the command interpreter 330 can interpret the statement as a command (e.g., schedule an appointment) and a noun/pronoun phrase (e.g., with her today). The command interpreter 330 may not understand which noun or nouns should replace "her" and as such, interpreter 330 can trigger the speech recognition engine 314 to send a disambiguation request to the application 312 (e.g., the calendar application). The calendar application can access the item of content relative to the pronoun "her." In this example, the item of content is a user contact that the user is viewing or otherwise accessing in the calendar application. The pronoun mapper 328 can map the pronoun "her" with the contact Jane Emerson, M.D. and the application 312 can send a response to the disambiguation request detailing the item of content relative to the pronoun (e.g., Jane Emerson, M.D.; email: janeE@urgentcare.com). The command interpreter 330 can use the received information and schedule an appointment for the user with Jane Emerson, M.D., as requested by the user in the speech input.

The weighting engine 316 may process one or more of the pronoun mappings by assigning weights to the different attributes within each mapping based on a likelihood that the attributes pertinent to the pronoun mapping have changed. This may include, for example, assigning a higher weight to contextual data describing text, image, or other similar attribute, and assigning a lower weight to contextual data describing raw coordinates, such as location or size, associated with one or more items selected by the user.

Figure 4A:
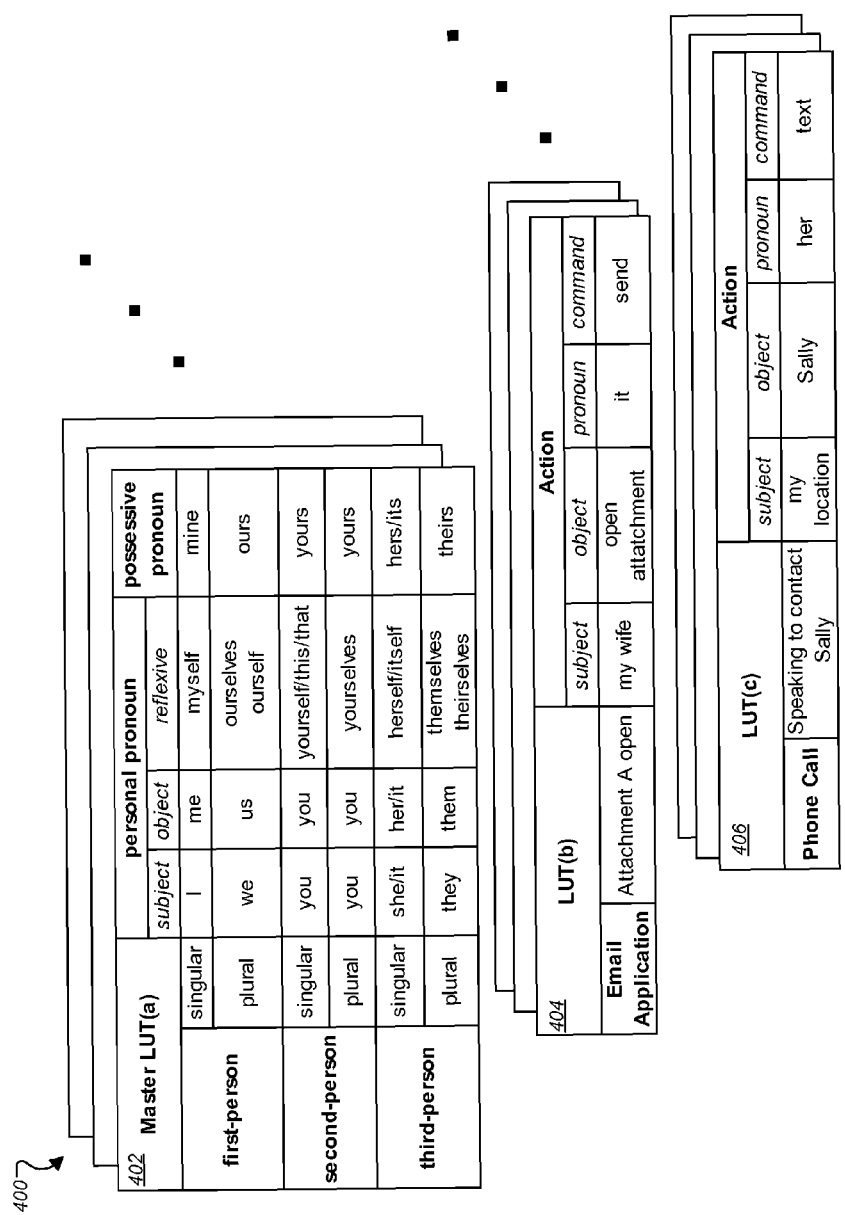
FIGS. 4A-4B represent information generated and stored for purposes of determining the semantic meaning of pronouns.
Figure 4B:
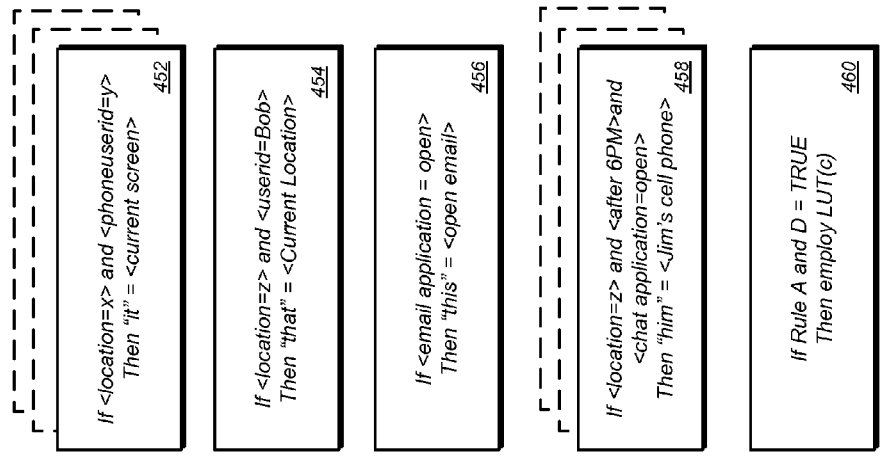

FIGS. 4A-4B represent information generated and stored for purposes of determining the context of pronouns. The information shown in FIGS. 4A-4B is exemplary and any number of tables or rules can be included to form databases of information accessible to devices, such as client device 102 or mobile device 302, for example.

Referring to FIG. 4A, a number of look up tables (LUTs) 400 are presented. The LUTs shown here include a Master LUT(a) 402 that details a number of personal pronouns and possessive pronouns, an LUT(b) 404 that details a table regarding an email application, and an LUT(c) 406 that details a table regarding a phone call activity. The LUTs 402, 404, and 406 (and other LUTs) can be accessed by application 312 and/or speech recognition engine 314 on mobile device 302, as will be described in the following examples. In some implementations, LUT content can be cached for future use. In some implementations, users can enter particular information on the mobile device 302 that can be cached to generate disambiguation responses and alternative responses to user requests, for example.

Referring to LUT 404, in certain implementations, a disambiguation request may be received from the speech recognition engine 314. The request may include information indicating that the user is currently using an email program and that an attachment A is open and active on device 302. The application 312 can use LUT 404 to determine how to disambiguate a pronoun received from the user. For example, if the user speaks "Send it to my wife," the application 312 knows the user is in an email program with an attachment open. As such, the application 312 can look up this scenario, find the line in LUT 404 that pertains to this scenario, and determine that the pronoun "it" should be disambiguated to the content in the open attachment on the screen. The application 312 can generate and send a response, to the speech recognition engine 314, which disambiguates the pronoun "it." For example, the application 312 can generate the command "Send open attachment to my wife."

Referring to LUT 406, in a similar fashion to the above example, a disambiguation request may be received from the speech recognition engine 314 detailing information indicating that the user is currently speaking to contact Sally in a telephone application on device 302. The application 312 can use LUT 406 to determine how to disambiguate a pronoun received from the user. For example, if the user speaks "Text her my location," the application 312 knows the user is in a phone call with Sally and, as such, the application 312 can look up this scenario, find the line in LUT 406 that pertains to the scenario, and determine that the pronoun "her" should be disambiguated to the user on the other end of the phone line (i.e., Sally). The application 312 can generate and send a response, to the speech recognition engine 314, that disambiguates the pronoun "her." For example, the application 312 can generate the command "Text Sally my location."

Referring to FIG. 4B, a number of rule sets 450 are presented. The rule sets 450 include rules 452-460, each representing some logic, operators, and parameters. Each rule can be used alone or in combination with one or more other rules. Other rules can be possible, including sub-rules and rules that are dependent on the fulfillment or completion of another rule. The rules 450 can be predetermined or determined on the fly as new user data is received. The rules 450 can be cached, weighted, modified, and combined as the application 312 collects more data.

Rule 452 discloses a location based rule that states "If <location=x> and <phoneuserid=y> Then 'it'=<current screen>." Here, the user's location is known as x (e.g., work) and the user is speaking on the phone to y (e.g., Sally). If both of those determinations are met and the user used the pronoun "it," then the rule implies that the pronoun "it" was intended to mean the content on the "current screen."

Rule 454 discloses another location based rule that states "If <location=z> and <userid=Bob> Then 'that'=<Current Location>." Here, the user's location is known as z (e.g., home) and the user is accessing some application having to do with the userid "Bob." If both of those determinations are met and the user used the pronoun "that," then the rule implies that the pronoun "that" was intended to mean the user's "current location."

Rule 456 discloses an application based rule that states "If <email application=open> Then 'this'=<open email>." Here, the user has an email application open and uses the pronoun "this." According to rule 456, the default rule is to use content in the "open email" as the semantic definition for the pronoun "this."

Rule 458 discloses another location based rule that states "If <location=z> and <after 6 PM> and <chat application=open> Then 'him'=<Jim's cell phone>." According to rule 458, if the user is at a location "z" (e.g., hockey practice) and the time is "after 6 PM," and the user is accessing a "chat application," then the pronoun "him" is synonymous with "Jim's cell phone" when requests and/or speech input is received with such a pronoun. In this example, the rule can be used to dial the correct number to reach someone after a time or at a particular location. Rule 458 may have an equal and opposite rule stating the similar content with one change from "after 6 PM" to "before 6 PM," which may allow dialing of a different number for daytime hours.

Rule 460 discloses a combination rule that combines a "Rule A" and a "Rule D" to make a decision. According to rule 460, if "Rule A" and "Rule D" are both TRUE (or all components of each rule are true), then the speech recognition engine 314 or the application 312 should employ a particular look up table, namely "LUT(c)."

In some implementations, rules are provided that apply to every situation that involves a particular pronoun. For example, a rule can be defined that states that "it" and "this" and "that" are equivalent pronouns and are interchangeable. In such a case, any other rule that includes one of these pronouns may apply to the other two pronouns as well. For example, "send this" and "send that" and "send it" may all have the same semantic definition.

Figure 5:
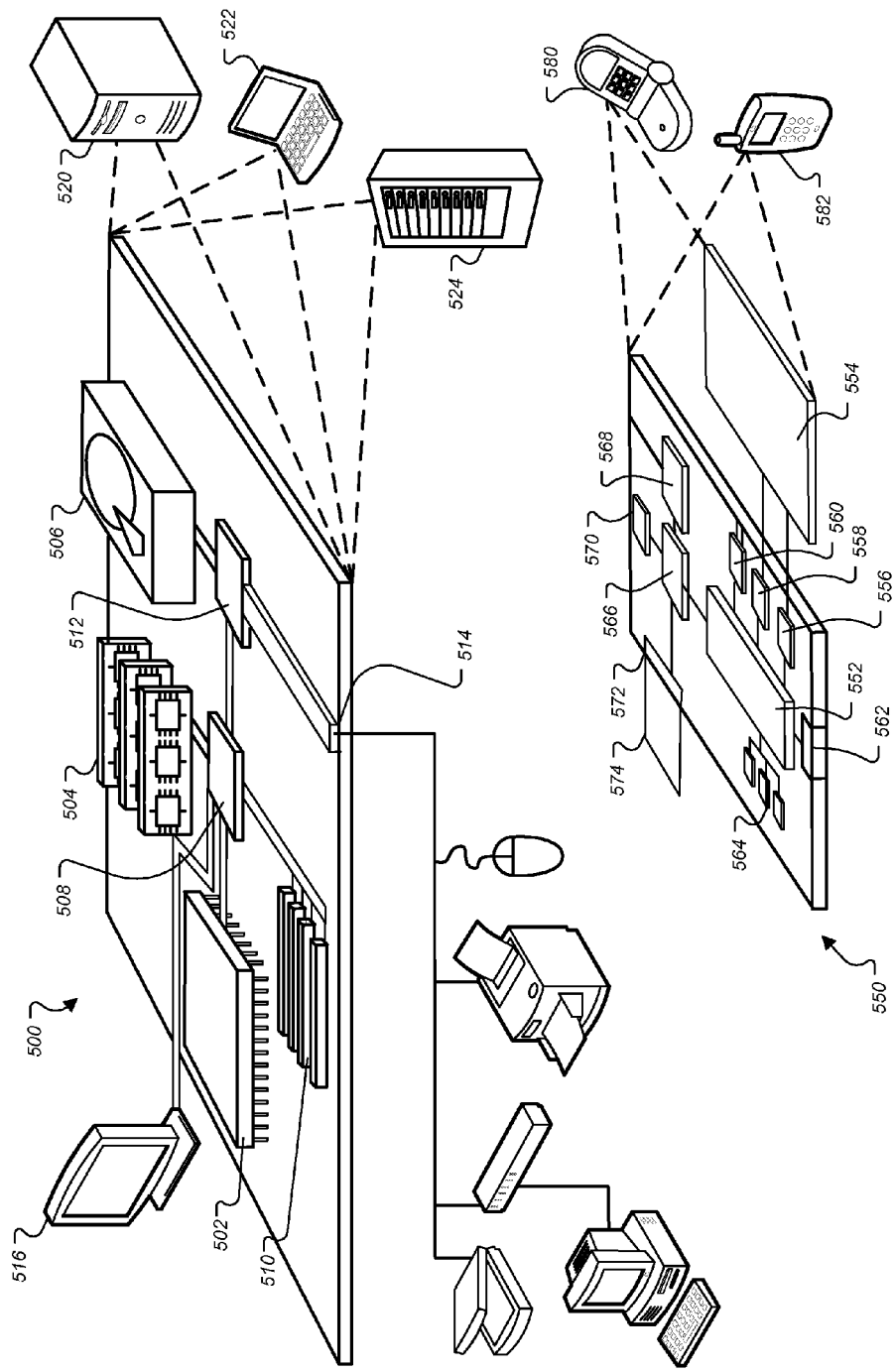
FIG. 5 is a schematic diagram of an example computer system.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, memory on processor 502, or a propagated signal.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, memory on processor 552, or a propagated signal that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Accordingly, other embodiments are within the scope of the following claims.

Although a few implementations have been described in detail above, other modifications are possible. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
receiving, by a speech recognition engine, data indicating a selection of a control for initiating speech recognition that is presented by a referring application;
receiving, by a speech recognition engine, audio data that encodes an utterance;
determining, by the speech recognition engine, that a transcription of the utterance includes one or more keywords associated with a command, and a pronoun;
transmitting, from the speech recognition engine to the referring application, a disambiguation request, wherein the disambiguation request identifies the pronoun;
receiving, by the speech recognition engine, a response to the disambiguation request from the referring application, wherein the response references an item of content identified by the application; and
generating, by the speech recognition engine, the command using the keywords and the response.

2. The method of claim 1, further comprising:
transmitting one or more additional disambiguation requests to a disambiguation engine;
receiving, by the speech recognition engine, a response to the one or more additional disambiguation requests;
merging results from the one or more additional disambiguation requests and the disambiguation request;
evaluating the merged results to determine a semantic connection between the referring application and the command; and
generating a mapping of the referring application to the command.

3. The method of claim 2, further comprising weighting the merged results and generating a set of weighted results.

4. The method of claim 1, wherein generating the command comprises accessing predetermined rules pertaining to one or more keywords associated with the pronoun.

5. The method of claim 1, wherein the response to the disambiguation request includes a GPS location and a user identifier.

6. The method of claim 5, wherein the speech recognition engine employs one or more predetermined rules based on the GPS location and the user identifier.

7. The method of claim 1, further comprising:
in response to determining that a transcription of the utterance includes one or more keywords associated with the command and the pronoun, selecting an application, other than the referring application, to receive the disambiguation request; and
transmitting the disambiguation request to the selected application.

8. A computer-implemented method comprising:
determining, by a referring application, that a control for initiating speech recognition that is presented by the referring application has been selected;
receiving, by the referring application, a disambiguation request from a speech recognition engine, wherein the disambiguation request identifies a pronoun;
identifying, by the referring application, an item of content based on the pronoun; and
transmitting, by the referring application, a response to the disambiguation request, wherein the response references the item of content.

9. The method of claim 7, wherein:
the disambiguation request further identifies a command associated with the pronoun, wherein the item of content is identified further based on the command.

10. The method of claim 9, wherein:
the item of content is identified based at least in part on the command and a predetermined rule set.

11. The method of claim 10, wherein the predetermined rule set pertains to the application.

12. A non-transitory computer-readable medium having instructions encoded thereon, which, when executed by a processor, cause the processor to perform operations comprising:
receiving, by a speech recognition engine, data indicating a selection of a control for initiating speech recognition that is presented by a referring application;
receiving, by a speech recognition engine, audio data that encodes an utterance;
determining, by the speech recognition engine, that a transcription of the utterance includes one or more keywords associated with a command, and a pronoun;
transmitting, from the speech recognition engine to the referring application, a disambiguation request, wherein the disambiguation request identifies the pronoun;
receiving, by the speech recognition engine, a response to the disambiguation request from the referring application, wherein the response references an item of content identified by the application; and
generating, by the speech recognition engine, the command using the keywords and the response.

13. The non-transitory medium of claim 12, further comprising:
transmitting one or more additional disambiguation requests to a disambiguation engine;
receiving, by the speech recognition engine, a response to the one or more additional disambiguation requests;
merging results from the one or more additional disambiguation requests and the disambiguation request;
evaluating the merged results to determine a semantic connection between the referring application and the command; and
generating a mapping of the referring application to the command.

14. The non-transitory medium of claim 13, further comprising weighting the merged results and generating a set of weighted results.

15. The non-transitory medium of claim 12, wherein generating the command comprises accessing predetermined rules pertaining to one or more keywords associated with the pronoun.

16. The non-transitory medium of claim 12, wherein the response to the disambiguation request includes a GPS location and a user identifier.

17. The non-transitory medium of claim 16, wherein the speech recognition engine employs one or more predetermined rules based on the GPS location and the user identifier.

18. A system comprising:
one or more computers and one or more storage devices storing instructions that are operable, when executed by the one or more computers, to cause the one or more computers to perform operations comprising:
receiving, by a speech recognition engine, data indicating a selection of a control for initiating speech recognition that is presented by a referring application;

receiving, by a speech recognition engine, audio data that encodes an utterance;

determining, by the speech recognition engine, that a transcription of the utterance includes one or more keywords associated with a command, and a pronoun;

transmitting, from the speech recognition engine to the referring application, a disambiguation request, wherein the disambiguation request identifies the pronoun;

receiving, by the speech recognition engine, a response to the disambiguation request from the referring application, wherein the response references an item of content identified by the application; and generating, by the speech recognition engine, the command using the keywords and the response.

19. The system of claim 18, further comprising:

transmitting one or more additional disambiguation requests to a disambiguation engine;

receiving, by the speech recognition engine, a response to the one or more additional disambiguation requests;

merging results from the one or more additional disambiguation requests and the disambiguation request;

evaluating the merged results to determine a semantic connection between the referring application and the command; and generating a mapping of the referring application to the command.

20. The system of claim 19, further comprising weighting the merged results and generating a set of weighted results.

21. The system of claim 18, wherein generating the command comprises accessing predetermined rules pertaining to one or more keywords associated with the pronoun.

22. The system of claim 18, wherein the response to the disambiguation request includes a GPS location and a user identifier.

23. The system of claim 22, wherein the speech recognition engine employs one or more predetermined rules based on the GPS location and the user identifier.

* * * * *